United States Patent [19]

Malvestuto, Jr.

[11] Patent Number: 5,195,702

[45] Date of Patent: Mar. 23, 1993

[54] ROTOR FLAP APPARATUS AND METHOD

[76] Inventor: Frank S. Malvestuto, Jr., 330 Winamar Ave., La Jolla, Calif. 92037

[21] Appl. No.: 683,596

[22] Filed: Apr. 9, 1991

[51] Int. Cl.$^5$ ............... B64C 23/02; B62D 37/02; B63G 8/20
[52] U.S. Cl. .................. 244/215; 244/206; 114/330; 296/180.5
[58] Field of Search .......... 244/51, 52, 66, 76 J, 244/92, 198, 201, 204, 206, 212, 213, 215, 217; 114/126, 285, 330, 332; 280/762; 296/91, 180.1, 180.5

[56] References Cited

U.S. PATENT DOCUMENTS

| | | | |
|---|---|---|---|
| Re. 29,023 | 11/1976 | Malvestuto, Jr. | 244/6 |
| 2,873,710 | 2/1959 | Morel | 114/126 |
| 2,976,077 | 3/1961 | Totton, Jr. | 296/180.5 |
| 3,179,354 | 4/1965 | Alvarez-Calderon | 244/206 |
| 3,203,649 | 8/1965 | Girard | 244/201 |
| 3,273,827 | 9/1966 | Girard | 244/201 |
| 3,512,825 | 5/1970 | Green | 296/180.5 |
| 3,521,589 | 7/1970 | Kemp | 114/330 |
| 3,856,238 | 12/1974 | Malvestuto, Jr. | 244/6 |
| 3,965,836 | 6/1976 | Malvestato, Jr. | 244/106 |

Primary Examiner—Joseph F. Peters, Jr.
Assistant Examiner—Virna Lissi Mojica
Attorney, Agent, or Firm—David J. Harshman

[57] ABSTRACT

A rotor flap apparatus is attached to the trailing edge of a wing of a craft. The rotor flap apparatus includes a rotatable rotor mounted on an attachment arm, which is pivotally mounted on a trailing edge of the wing. The attachment arm can be raised or lowered to move the plane of the rotor up or down to vary the lift and thrust characteristics of the wing, to prevent stall and also to allow very low speed take off and landing. In one embodiment, propellers are provided at the leading edge of the wing, in conjunction with the rotor flap apparatus, to provide a system which allows vertical take off and landing of the aircraft. Other embodiments include wings with rotor flap apparatus attached to land craft and underwater craft as well.

14 Claims, 6 Drawing Sheets

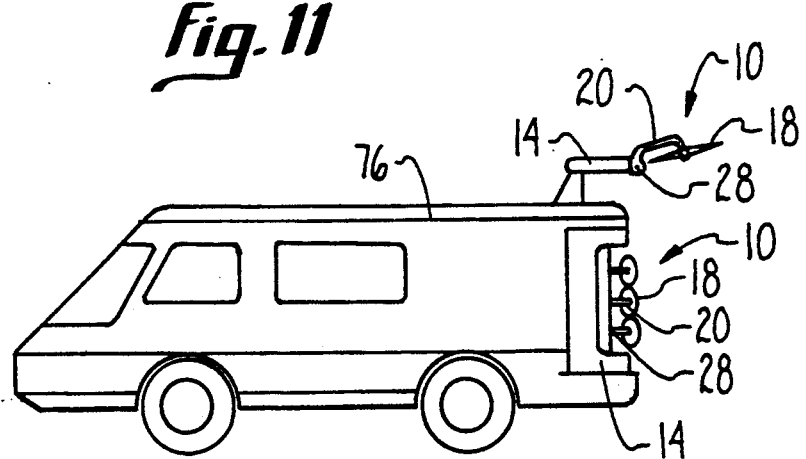
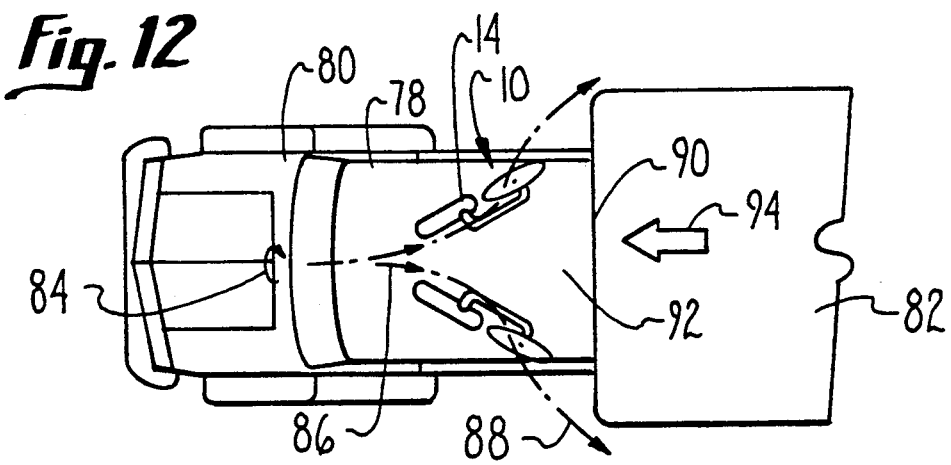
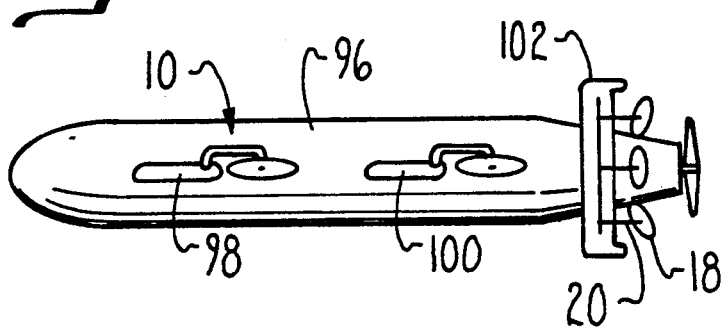
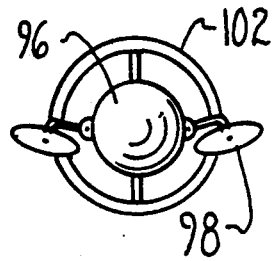

ROTOR FLAP APPARATUS AND METHOD

FIELD OF THE INVENTION

This invention relates generally to various types craft and configurations of craft which move through a medium. More specifically, the invention relates to craft which by virtue of their motion through a medium, generate lift and/or drag forces on a craft. The present invention is particularly, though not exclusively, useful for attachment to the wings of an aircraft, or to a surface watercraft, an underwater craft, or a ground vehicle. It is also useful for attachment to a helicopter rotor or any similar rotating surface.

BACKGROUND OF THE INVENTION

In the past, there have been different devices used to modify the performance characteristics of a winged craft. This includes aircraft as well as land or water craft which use a wing that moves through air or water. Such devices have included adding a propeller on the trailing edge end of such a specially designed wing.

For example, in U.S. Pat. No. Re29,023 to Malvestuto, Jr., the inventor herein, there is disclosed a means and method of rotor-augmented lift for airplanes. In particular, it discloses an aircraft having a wing divided with a semi-circular recess in the trailing edge of the wing. A powered rotor which is rotatable about the axis of the recess, has blades whose tips extend close to the semi-circular edge of the recess, below the upper surface of the wing. The rotor produces direct upward thrust on the aircraft and also creates low pressure over the wings and high pressure below the wings to augment the direct upward thrust of the rotor. Air moving centrifugally impinges on the edged surface of the recess to produce forward thrust.

Another patent of interest is U.S. Pat. No. 3,856,238, also to Malvestuto, Jr., the inventor herein, for an aircraft transporter. The transporter has a plurality of wings each of which has a portion of the trailing edge configured to define a semicircle. A power-driven rotor is mounted in the semicircle on a fixed axis of rotation of the rotor, which is slightly canted relative to the forward direction of aircraft movement to provide a component of forward thrust. In addition, lighter than air buoyancy units are connected to the ends of the wings to provide additional lifting force.

In yet another invention of interest, there is disclosed a high-speed water vessel in U.S. Pat. No. 3,965,836, to Malvestuto, Jr., the inventor herein, which includes rotors located within semicircular shaped recesses in the trailing edges of air foils attached to the water vessel. Rotation of the blades provides thrust forces against the trailing edges of the air foils to propel the vessel forwardly through the water. In addition, lift forces raise the hull of the vessel so the vessel can move through the water at higher speeds.

In spite of the advantages obtained with devices of the type as described above, there still remains a need for enhancing wing surface aerodynamics and performance to allow additional craft control and propulsion capabilities. For an aircraft, such capabilities would include vertical take-off and landing, extremely low speed flight without degradation of high speed capability, increased cruise range and/or loiter time, increased payload, and safety. For a land craft (i.e., ground vehicle), this would include the capability to reduce unwanted drag in the case of cars or trucks, or to generate additional downward thrust in the case of racing vehicles. For a watercraft, this would include the capability to provide lift and forward thrust. For an underwater craft, this would include enhanced performance and maneuvering capabilities.

For example, in various logistical maneuvers using cargo aircraft, it is desirable for the air craft to have the ability to become airborne at very low speeds. This permits shortened take off and landing distances which can be very critical in certain applications, such as military maneuvering. In addition, it is very desirable to have a wing which has a design so that it tends to prevent a stall condition to occur. A stall condition occurs when the angle of attack of the wing, or the overall angle with respect to the generally horizontal direction of movement, is too steep. In such a case, the normal flow of air across the wing is disrupted, causing the wing to lose all lift capability. In this instance, the aircraft begins to fall, which can be disastrous.

In the past, in order to achieve higher values of wing lift, which is especially critical during take off and landing of the aircraft at low speeds, there has been the use of flaps. Flaps are hinged mechanical devices designed to alter, temporarily, the geometry of the wing. Flaps achieve higher values of wing lift at speeds which are lower than the minimum speed of the aircraft without the use of the flaps, i.e., with the flaps retracted. When flaps are used, however, there is a significant increase in the possibility of wing stall or flow separation. Thus, for many aircraft, the flaps operate in conjunction with other mechanical devices such as leading edge flaps and the like in order to control stall without sacrificing the required lift for take off and landing. Moreover, conventional flap systems are mechanically extremely complicated, and require careful operation by the pilot in order to achieve the desired lift without stalling the wings of the aircraft when in flight.

Another disadvantage is that when flaps are in their operational mode, i.e., deflected, in addition to the desired aerodynamic wing lift, there is a large increment of unfavorable aerodynamic wing drag. The drag penalty due to flap deflection therefore requires additional power and fuel to compensate for this drag, which is the conventional solution. This is in order to safely maintain the appropriate flight speed of the craft during take off, climb to cruise altitude, landing approach, and landing phases of flight. Unfortunately, this aerodynamic drag penalty when the flap is operational, and need for additional power requirements to overcome such drag, is an undesirable result.

Accordingly, it is an object of the present invention to provide a rotor flap apparatus for attachment to the wing of a craft which provides changes in the magnitudes and arrangement of lift and/or drag forces so that the operating performance of the craft is significantly enhanced. The wing can be planar as represented by an aircraft wing, or can be an annular surface such as a ring wing.

It is further an object of the present invention to provide a rotor flap apparatus for attachment to the wing of a craft which lessens the chance of a stall condition, especially during extremely low-speed takeoff and landings in the case of an aircraft.

It is yet another object of the present invention to provide a rotor flap apparatus which does not generate unwanted aerodynamic drag during operation, and therefore, does not require additional power requirements to overcome such drag.

Yet another object of the present invention is to provide such rotor flap apparatus which can improve the performance of a craft by providing forward thrust force for increasing flight speed.

Still another object of the present invention is to provide such rotor flap apparatus which can also provide a rearward acting thrust force for reducing flight speed for steep landing approaches and takeoffs at very low speeds in the case of an aircraft.

Another object of the present invention is to provide a rotor flap apparatus for reducing aerodynamic drag forces acting on a ground vehicle.

A further object of the present invention is to provide a rotor flap apparatus for enhancing the maneuverability of underwater craft.

Another object of the present invention is to construct a rotor flap apparatus which is relatively simple in construction.

Yet another object of the present invention is to construct a rotor flap apparatus which is cost effective in its manufacture, and durable and reliable in use.

SUMMARY OF THE INVENTION

A preferred embodiment of the novel rotor flap apparatus includes a rotatable rotor mounted at a trailing edge portion of a wing of a craft. The rotor has blades with tips and is connected to a drive mechanism for rotating the rotor about an axis of rotation. The rotor is mounted on the wing by a movable attachment arm, which varies the orientation of the axis of rotation of the rotor with respect to the wing. The axis of rotation is variable between zero and one hundred eighty degrees with respect to the chord plane of the wing, i.e., ninety degrees above and below the chord plane. When the rotor is rotated, the movable attachment arm also maintains the orientation of the rotating blade tips substantially behind the trailing edge of the wing. By raising or lowering the attachment arm and changing the angle of the axis of rotation, the trailing edge rotor affects the movement of air across the upper and lower surfaces of the wing to create additional lift at very low craft speed. In addition, additional thrust forces are generated, and drag of conventional flap design is virtually eliminated.

In one embodiment for an aircraft, a plurality of rotors are mounted on the trailing edge of a wing in addition to the flap. In another embodiment for an aircraft, the rotor flap is mounted on a wing behind the propeller, to permit a craft to be lifted almost vertically. In the embodiment for a land craft, a wing and rotor flap apparatus is attached to reduce aerodynamic drag forces, and generate thrust. In yet another embodiment for an underwater craft, a rotor flap apparatus is attached to a wing or fin to permit enhanced maneuverability.

The novel features of this invention as well as the invention itself, both are to structure and its operation will be best understood from the accompanying drawings taken in conjunction with the accompanying description, in which similar reference characters refer to similar parts and in which:

BRIEF DESCRIPTION OF THE DRAWINGS

FIG. 11 is a side view of a land craft, namely and automobile, with wing and rotor flap apparatus attached to the top and sides;

FIG. 12 is a top view of another land craft, namely a truck, with a wing and rotor flap apparatus attached to the top; and FIG. 13 is a side view of an underwater craft, namely a submarine, with a rotor flap apparatus attached to the sides and aft portion.

FIG. 14 is a front view of the underwater craft shown in FIG. 13.

DESCRIPTION OF THE PREFERRED EMBODIMENTS

Figure 1:
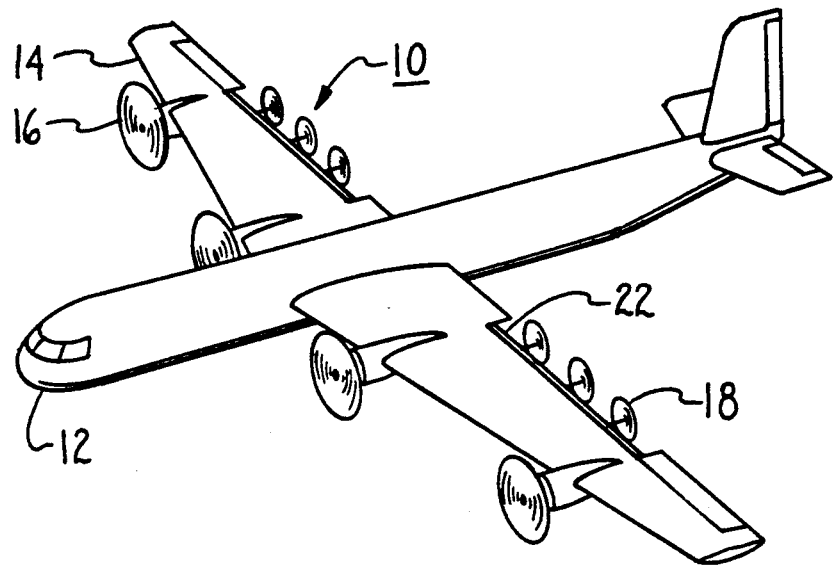
FIG. 1 is a perspective view of a preferred embodiment of a rotor flap apparatus attached to the wings of an aircraft in accordance with the present invention.

Referring now to FIG. 1 there is shown a preferred embodiment of a rotor flap apparatus, generally designated as 10, in its intended environments. In particular, there is shown an aircraft 12 having wings or airfoils 14 for moving craft 12 through a medium, namely air. In the embodiment shown, the wings or air foils 14 are for moving the aircraft through air, by providing lift as is conventionally known. The teachings of the present invention, however, may apply equally as well to other craft, such as water craft or land craft such as boats or automobiles which use an air foil for effecting the lift and/or drag effects on the craft or vehicle as it moves through a medium, namely air. Similarly, the medium as well could be water, as with under-water craft such as a submarine, which has winglike fins or rudders which could act, in effect, as a water foil or wing. In the embodiment shown in FIG. 1, aircraft 12 includes propeller 16 for providing the primary forward thrust to propel the craft through the medium. It can be appreciated as well, however, that in addition to or in lieu of the propeller there could be other forms of forward thrust sources, such as jet engines, depending on the performance characteristics desired of the craft 12. Further details of the rotor flap apparatus can perhaps best be appreciated further with reference to FIGS. 2, 3, and 4.

Figure 2:
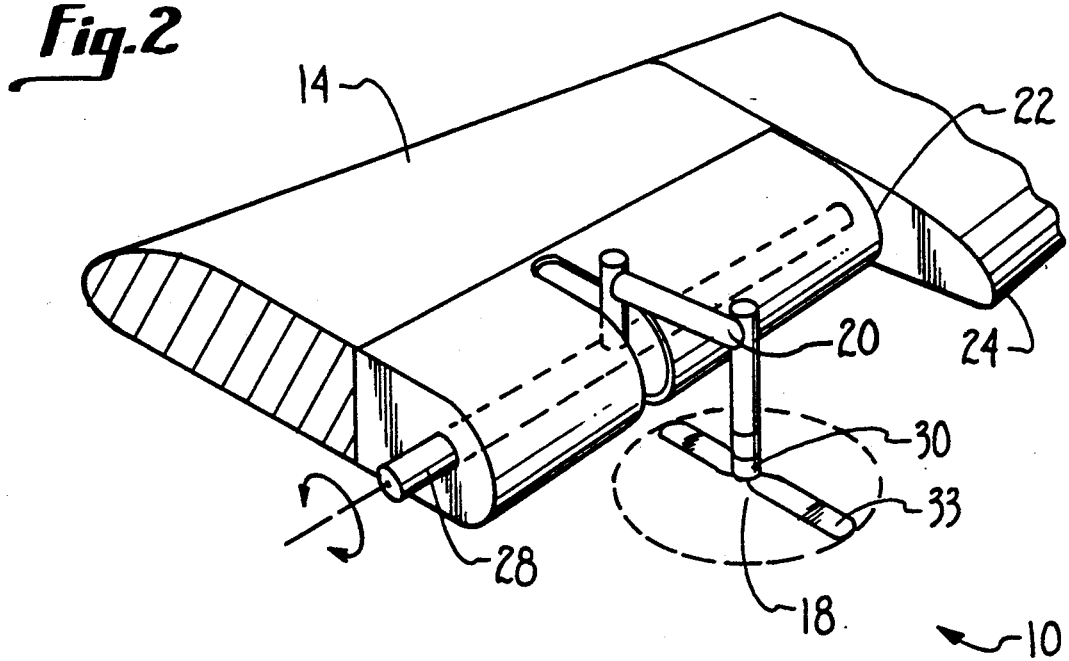
FIG. 2 is a perspective cut-a-way view of a portion of a rotor flap apparatus illustrating its attachment to a wing.
Figure 3:
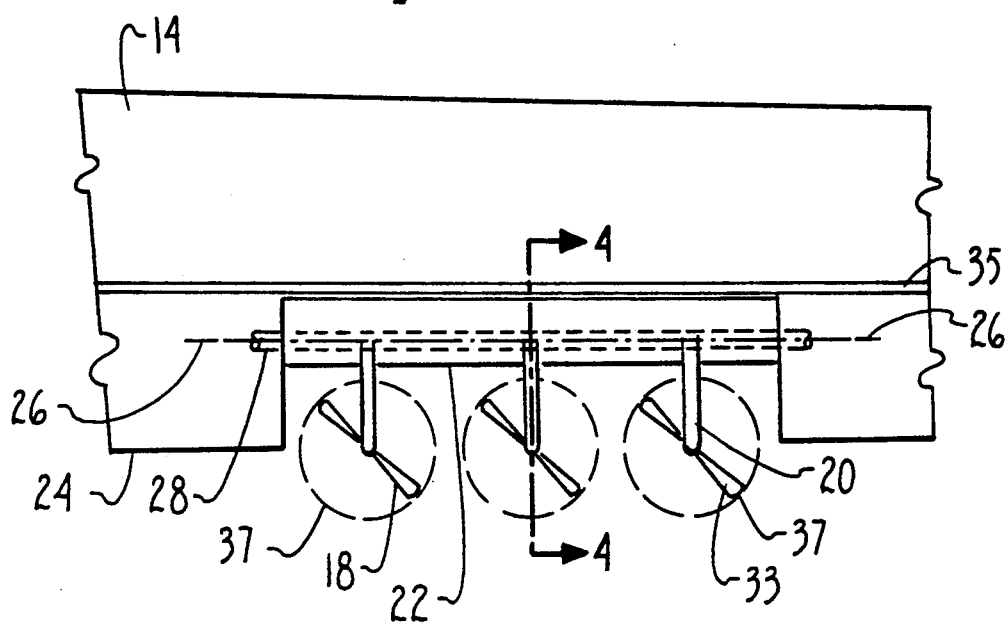
FIG. 3 is a top plan view of a portion of a wing showing the rotor flap apparatus of the present invention.
Figure 4:
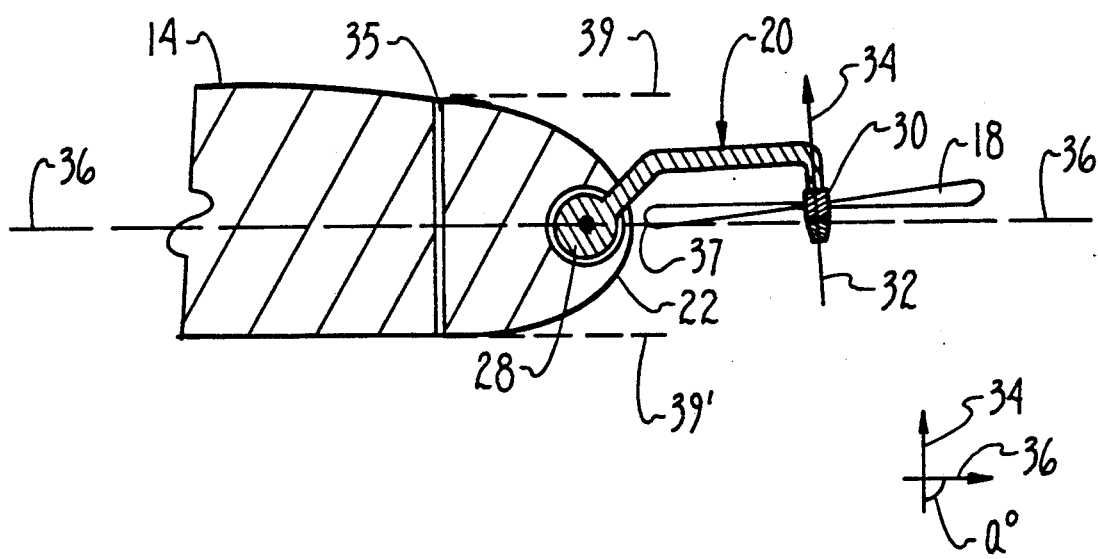
FIG. 4 is a side cross-sectional view taken along line 4—4 of FIG. 3.

There is shown in FIGS. 2, 3, and 4 rotor flap apparatus 10 which comprises a rotor 18, rotatably mounted on one end of an attachment arm 20. The other end of the attachment arm 20 is pivotally connected to a trailing edge portion 22 of wing 14. Trailing edge portion 22 of wing 14 is recessed with respect to trailing edge 24 of wing 14 as shown in FIG. 2. Further, as seen in the embodiment shown, there are three such rotors 18 mounted side by side to three attachment arms 20. As can be appreciated, there can be more or less rotors, and the size of the rotors and attachment arms can vary, depending upon the application required as explained further herein. In any event, each attachment arm 20 is connected to trailing edge portion 22 so that it is reciprocally rotatable about a longitudinal axis 26. In the embodiment shown, this is accomplished by attaching each attachment arm 20 to a rotatable rod 28 which can be driven in either direction of rotation to in effect reciprocally raise or lower attachment arm 20, and therefore rotor 18.

Rotor 18 is drivingly engaged to attachment arm 20 by means of a drive mechanism 30 which is connected by conventional means to a power source, not shown. Rotor 18 is rotatable about an axis of rotation 32, and may have two or more rotor blades 33, and is rotated in a direction to generate a rotor thrust force in the direction as shown by the arrow 34. Each blade 33 also has a tip 35. As further shown in FIGS. 2, 3, and 4 wing 14 includes a rear wing spar 35' which on a conventional wing is a convenient place at which to attach the rotor flap apparatus 10 in the existing section at which a conventional flap would normally be positioned. Thus, the rotor flap apparatus 10 then can be retrofitted in place of a conventional wing flap, without requiring extensive reconstruction of a conventional wing.

It can be seen, with respect to FIG. 4, that rotor 18 rotates about the axis of rotation 32 which axis 32 forms an angle "a" with respect to a chord plane 36 of wing 14. A chord in aeronautics is a straight line from the leading edge to the trailing edge of an air foil. As further shown in FIG. 4, and as further explained below, in the preferred embodiment, this angle "a" may vary from 0 degrees to 180 degrees. At 0 degrees, the rotor attachment arm 20 is essentially raised up perpendicular to chord plane 36, so the axis of rotation 32 of rotor 18 is parallel to and above chord plane 36, with the thrust arrow 34 pointing forward. At 90 degrees, the attachment arm 20 and rotor 18 lies in a plane parallel to chord plane 36, so the axis of rotation 32 is perpendicular to chord plane 36, with thrust arrow 34 pointing directly upward at 90 degrees to the chord plane. At 180 degrees, the attachment arm 20 is fully down perpendicular to chord plane 36, so the axis of rotation 32 is parallel to, but beneath, chord plane 36, with the thrust arrow 34 pointing in the rearward direction.

It is also important to note, that rotor 18 is attached to wing 14, in a manner such that the forward edge 37 of tips 35 of rotating blades 33 is always behind trailing edge 22, of within the "shadow" 39,39' of a vertical cross section of trailing edge 22 of the wing 14. No matter how far up or down rotor flap 18 is raised or lowered, forward edge 37 of tips 35 of rotating blades 33 is always behind trailing edge 22.

Figure 5:
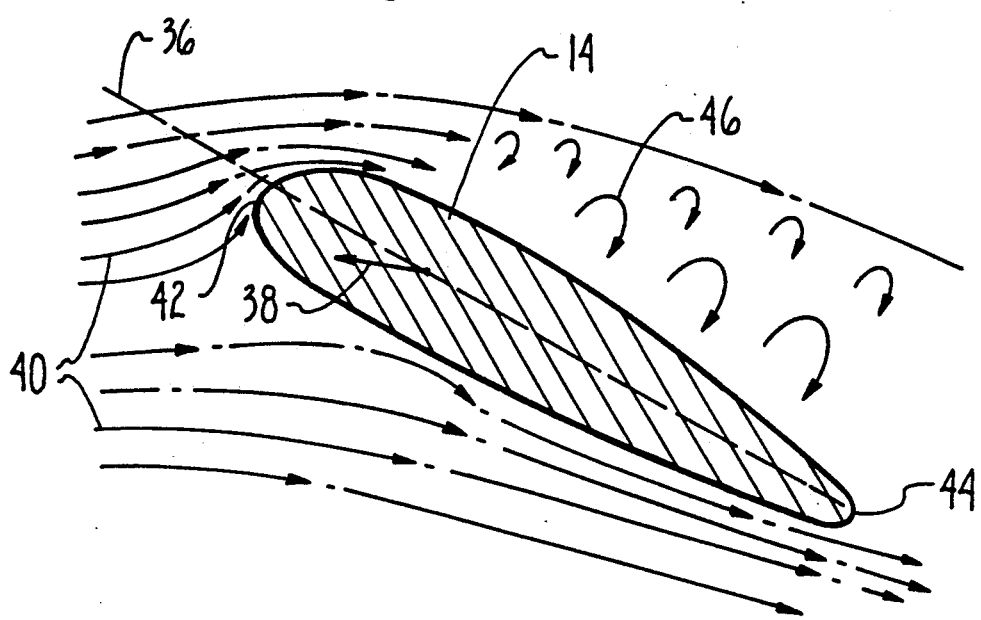
FIG. 5 is a side cross sectional view of a conventional wing schematically illustrating a stall condition.
Figure 6:
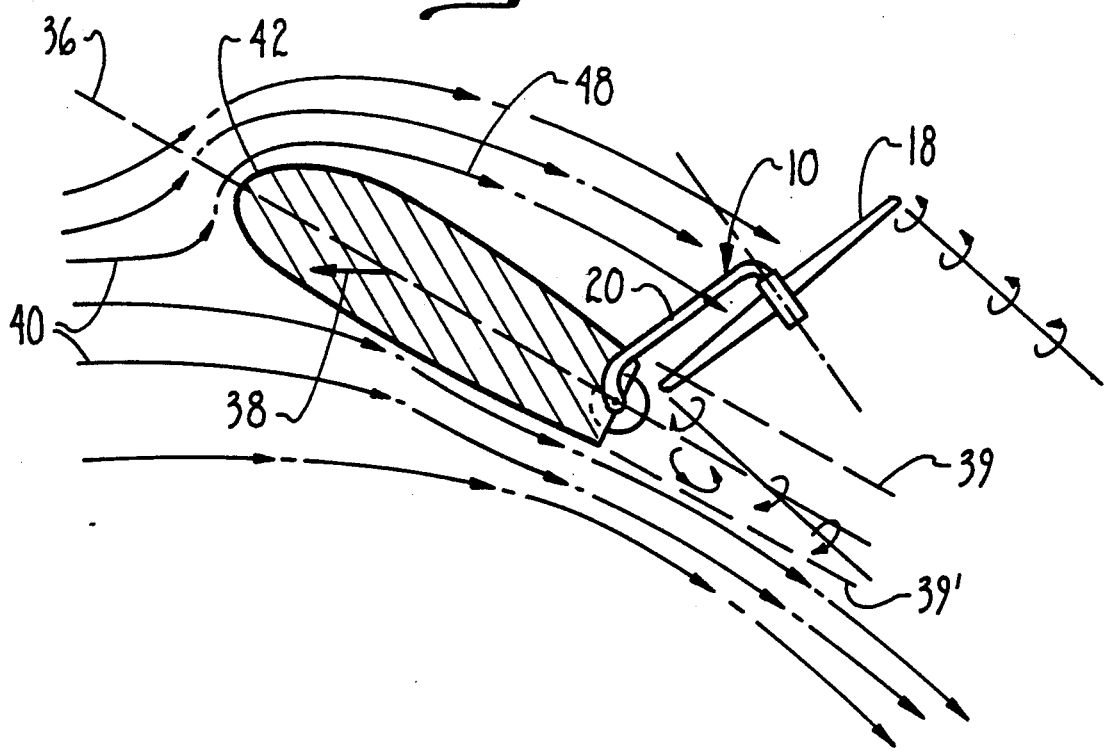
FIG. 6 is a side cross sectional view of a wing with a rotor flap apparatus illustrating prevention of a stall condition.

Referring now to FIGS. 5 and 6 it can be appreciated how the present rotor flap apparatus 10 can be effectively used to prevent wing stall. In particular, in FIG. 5 there is schematically shown an example of the phenomenon of wing stall. Wing 14 has a chord plane 36. The wing 14 is attached to a craft, not shown, that is moving generally in the direction of arrow 38. As can be seen in FIG. 5, the air flow is represented by flow arrows 40 flow across the wing 14 as the wing 14 moves through a medium, in this case, air. In the stall condition of FIG. 5, the angle of chord plane with the forward movement direction 38, is too great, i.e., the angle of attack is too steep, for the particular speed and load conditions, such that the normal straight line flow over the top of wing 14 from leading edge 42 the trailing edge 44 is disrupted, which results in small arrow eddies 46. As a result of this disruption, the normal upward lift of the wing from the normally lower pressure differential as a result of straight line flow over the top surface of the wing 14, is interrupted. The lift force is eliminated which results in a stall condition. This condition can be effectively prevented, however, by application of applicant's present invention.

In particular, in FIG. 6 there is shown wing 14 having a chord plane 36, attached to a craft moving generally in the direction of directional arrow 38. In addition, however, there is a rotor flap apparatus 10 attached to wing 14, with the attachment arm 20 in a raised position. As a result, rotational operation of rotor 18 results in a modified condition whereby the normal straight line flow 48 of medium over the top surface of wing 14 is maintained, and the flow disruption condition does not occur. As a consequence, the lift forces associated with such straight line air flow 48 is maintained. Thus, for the same angle of attack with similar speed and load conditions, the stall condition is avoided. Furthermore, even steeper angles of attack can be attained without a stall condition, by varying the angle of the attachment arm 20 and rotor 18 in relation to the chord plane 36 of wing 14. This allows for steeper ascent of the craft, and also avoids this stall condition. It is noteworthy that upon raising rotors 18, the forward edge 37 of tips 35 of rotating blades 33 remains behind trailing edge 22, in the shadow 39,39' of airflow over wing 14.

Figure 7:
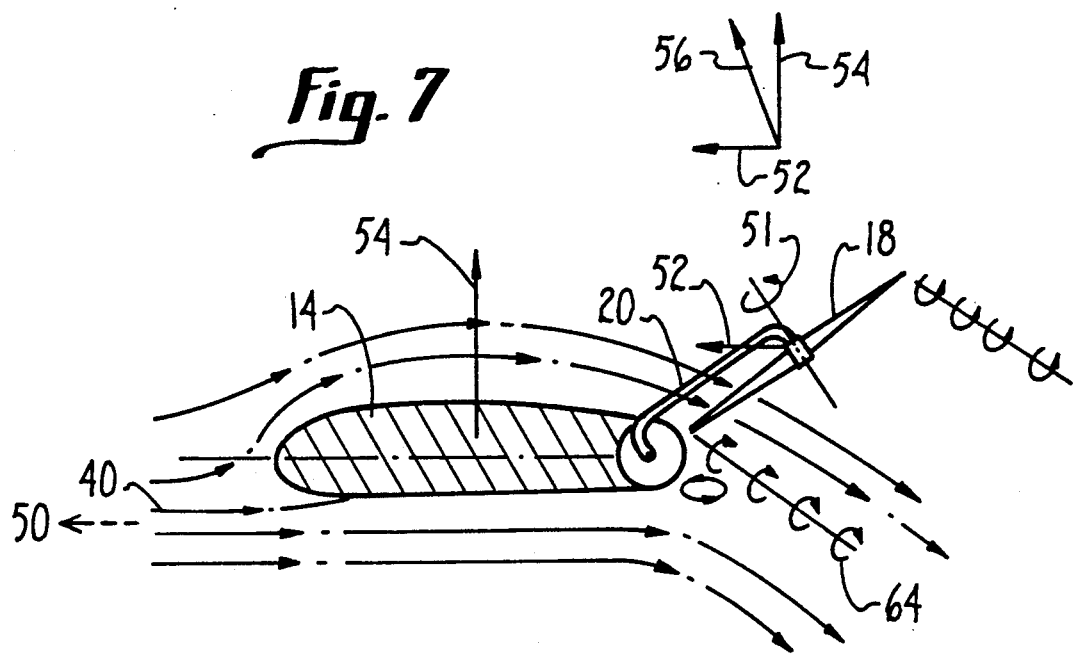
FIG. 7 is a schematic side view of the apparatus shown in FIG. 4 in operation, having been raised to an inclined position.
Figure 8:
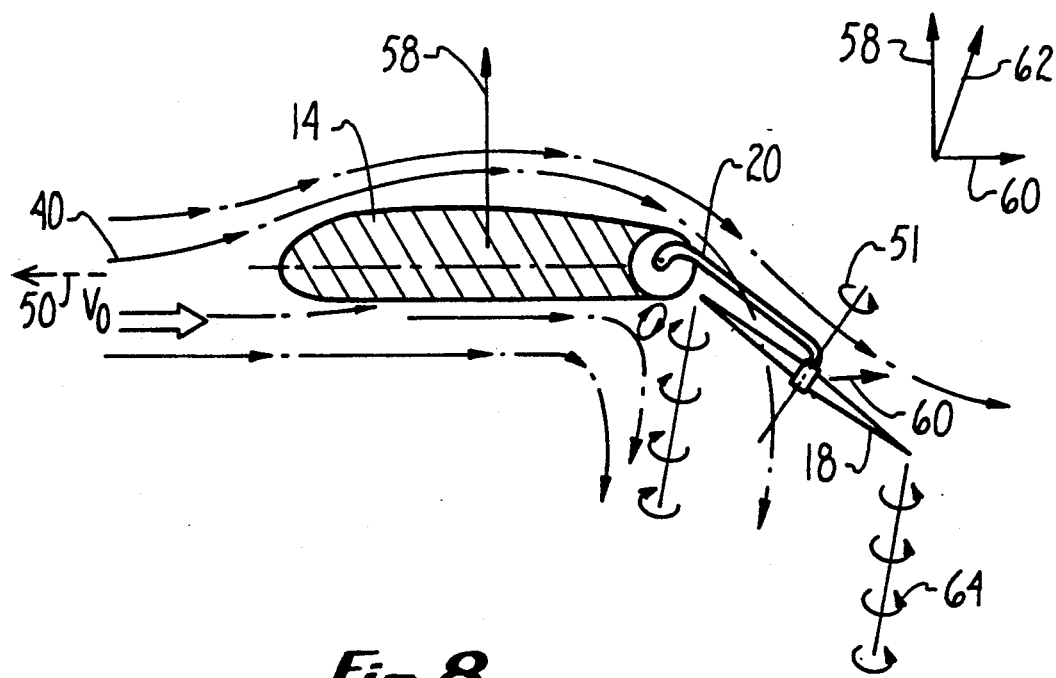
FIG. 8 is a schematic side view of the rotor flap apparatus shown in FIG. 4, having been lowered to a declined position.

FIGS. 7 and 8 further schematically illustrate the operation of the rotor flap apparatus 10 of the presently claimed invention. In particular, in FIG. 7 and 8, there is an arrow 50 representing forward motion. In FIG. 7, when rotor flap apparatus 10, rotating in direction 51, is rotated or deflected upward to a desired angle as shown, in addition to significant lift, there is a forward acting force component 52 will propel the wing of the craft to higher speeds. In addition, there is a resultant induced lift 54. These result in an induced resultant force 56. On the other hand, as illustrated in FIG. 8, when the rotor flap apparatus 10 is rotated downward to a desired angle as shown, in addition to providing significant lift 58 when the rotors 18 are operational, there is a rearward acting component 60, yielding a total resultant force 62. This component 62 reduces the flight speed of the aircraft which may be desired for various profiles found in a craft, such as for low speed or short distance take off, or slowing down for short distance landing. It is also shown in FIGS. 7 and 8, how trailing vortexes 64 are created which can further induce lift.

Figure 9:
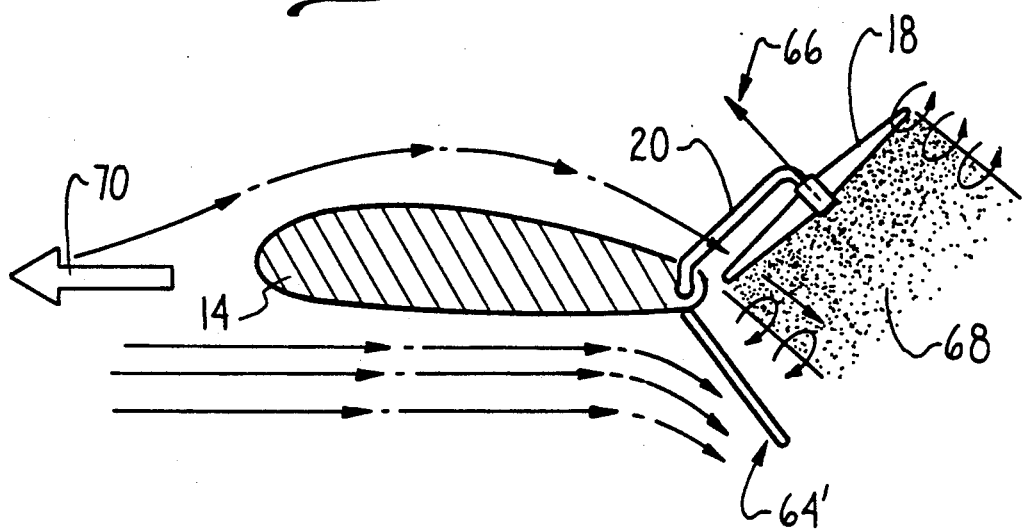
FIG. 9 is a side cross sectional view of a wing and rotor flap apparatus working in conjunction with a conventional wing flap.

In another embodiment of the present invention, as seen in FIG. 9, the rotor flap apparatus 10 is mounted in conjunction with a conventional flap 64 of an aircraft wing 14, as shown in FIG. 9. Rotor thrust shown as arrow 66, generates a shadow of turbulence 68, and has a forward thrust component 70. As shown, the attendant adverse drag of a conventional flap wing combination can be considerably reduced by using the rotor flap apparatus 10, in combination with the conventional flap. The aerodynamic efficiency, measured by the wing lift and drag ratio of the conventional flap and rotor flap apparatus in combination, has been shown to be two to three times greater than the aerodynamic efficiency as conventional wing flap systems. Thus, the significant reduction in wing flap drag permits considerably less power, and therefore less fuel to be used for, in the case of aircraft, take off, climbing, descent, and landing of the aircraft. Furthermore, the rotor flap apparatus 10 can be used in conjunction with a conventional flap to prevent wing stall as described earlier herein.

Figure 10:
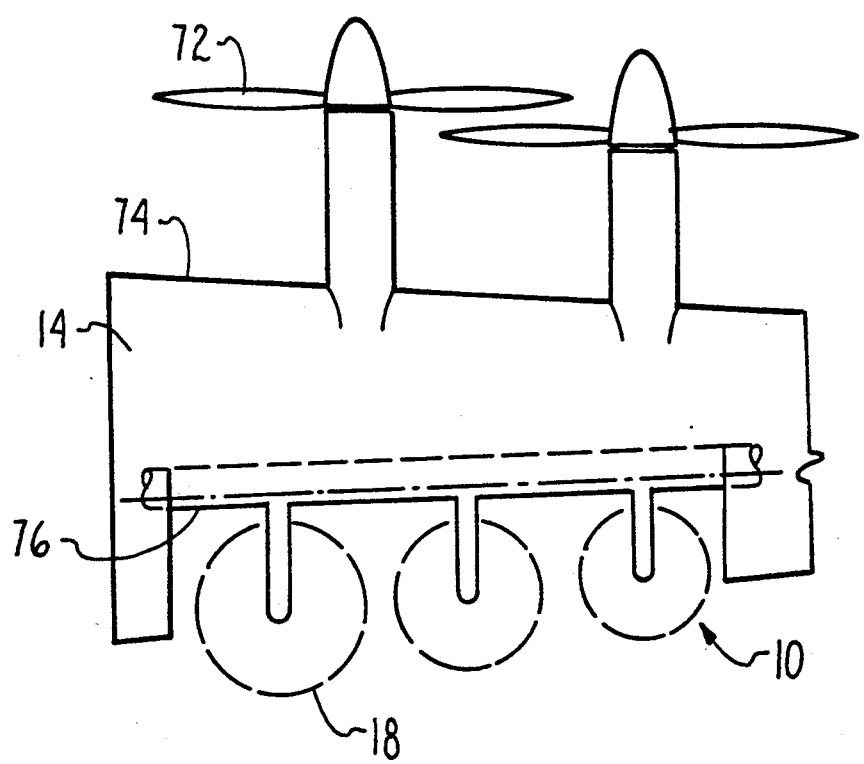
FIG. 10 is a top plan view of a wing and rotor flap apparatus, which includes leading edge propeller for providing vertical lift.

In FIG. 10 there is shown another embodiment of the rotor flap apparatus 10 being used on the wing of an aircraft in combination with propellers 72 mounted on leading edge 74 of wing 14. It has been found that a wing equipped with a rotor flap apparatus 10 can generate large amounts of lift at extremely low speeds, such as 25 to 35 miles per hour, without wing stall. For example, at low speeds, approximately 60 to 100 pounds of total lift, depending upon design, can be generated per one shaft horsepower applied to the rotor system. However, since rotation of lead propellers 72, generates a flow of air over the wing 14 from the leading edge 74 to the trailing edge 76, essentially independently of any forward movement of the wing 14, there is provided a wing system that can lift a craft virtually vertically. It is power and fuel efficient. Rotating propellers 72 in front of leading edge 74 of the wing 14, and of the rotor flap apparatus 10, generates large amounts of wing and rotor lift with no attendant drag. This is accomplished by the pressure, in which the slip stream or aft flow of the lead propellers 72 encompasses the rotor flap 10, which is positioned behind and in the flow from the propellers 72. It should be noted that the lead propellers 72 are positioned at some distance in front of the leading edge 74 of the wing 14. This distance can be modified depending upon the characteristics desired. In addition, in the embodiment shown in FIG. 10, the different rotors 18 are of different sizes. As mentioned earlier in the application the size and number of rotors can be varied according to the particular application.

Furthermore, it is important to note that in addition, the side-by-side placement of a plurality of rotors work together as a system, which can produce a system of trailing vortexes that contribute in producing induced lift on the wings via the circulation of the air.

Referring now to FIG. 11, there is shown application of the present invention to a land craft, such as a van-type automobile. Attached to the rear of an automobile 76 is a horizontal top wing 14, and attached rotor flap apparatus 10, comprising a pivotal attachment arm 20 connected to a driven rod and driven rotor 18. In addition, a pair of vertical side wings 14 with a rotor flap apparatus 10 (only one of which is shown) attached to each. By appropriate use of rotor flap apparatus as described above, surface and rear end drag normally associated with a van can be significantly reduced. In the embodiment shown, side and top rotor flap apparatus are used, but side or top alone can be used as desired.

In FIG. 12, there is shown another application of the present invention to another land craft or vehicle, namely a truck. There is shown a pair of wings 14 and rotor flap apparatus 10 attached vertically on top 78 of truck cab 80, in front of storage trailer 82. This establishes an acute angle 84 between wings 14. The apparatus 10 directs incoming airflow 86 away from and around blunt face 88 of storage trailer 82 as shown by arrow 88. This significantly reduces the drag presented by blunt force 90, and also results in a partial vacuum at area 92 to provide a forward thrust force 94.

Finally, in FIG. 13, there is shown an application of the present invention to an underwater craft 96. Underwater craft 96 includes horizontal wings or fins 98 and 100, and a circular aft fin 102, with a rotor flap apparatus pivotally attached to each. By varying the angle of pitch of the rotor flaps 10, the underwater craft 96 can dive, ascend, cruise, and maneuver without ballast. In addition, there is a drag reduction effect.

Although the particular rotor flap apparatus as herein shown and described in detail is very capable of obtaining the advantages and providing the objects hereinbefore stated, it should be understood that it is merely demonstrative of the present preferred embodiment of the invention in that no limitations are intended to the details of construction or design herein shown other than as defined in the appendaged claims.

What is claimed is:

1. A rotor flap apparatus attached to a wing of an object of the type which moves through a medium, comprising:
    a rotor rotatable about an axis of rotation;
    drive means for rotating said rotor about said axis of rotation; and
    movable attachment means mounting said rotor to a trailing edge portion of said wing for variably disposing said rotor to vary the orientation of said axis of rotation with respect to said wing;
    wherein said rotor has tips and is mounted so that during rotation a forward edge of said tips are disposed substantially behind and within a vertical cross-section of said trailing edge portion of said wing.

2. The apparatus of claim 1, further comprising a propeller mounted on a leading edge of said wing to establish additional flow of said medium across said wing and into said rotor.

3. The apparatus of claim 1, wherein said wing has a chord plane and said attachment means varies the orientation of said axis of rotation between an angle of from 0 to 180 degrees with respect to the chord plane of said wing.

4. The apparatus of claim 3, wherein said attachment means comprises an attachment arm movably connected to said trailing edge of said wing.

5. The apparatus of claim 1, wherein said rotor flap apparatus comprises a plurality of rotors.

6. The apparatus of claim 1 wherein said rotor is rotated in a direction to provide upward thrust normal to said wing when said rotor rotates in a plane substantially parallel to said wing.

7. The apparatus of claim 1, further comprising a plurality of said rotors mounted adjacent one another so that said axes of rotation remain parallel to one another.

8. The apparatus of claim 1, wherein said wing has a flap, and said rotor flap apparatus is mounted above said flap.

9. An apparatus for adjustably controlling lift and drag forces generated by an object moving through a medium comprising:
    a wing having a leading edge and a trailing edge;
    means for attaching said wing to said object;
    a rotatable rotor having an axis of rotation and a rotor blade having a tip;
    means for pivotally attaching said rotatable rotor to said trailing edge of said wing for pivoting said axis of rotation while keeping a forward edge of said rotating blades disposed substantially behind and within a vertical cross section of said trailing edge of said wing.

10. The apparatus of claim 9, wherein said object is a land vehicle, and said wing is attached to a rear position of said vehicle.

11. The apparatus as in 10, wherein a pair of said wings is attached to the top of said vehicle in a substantially vertical position, and at an angle to form an acute intersecting angle between said wings.

12. The apparatus as in 9, wherein said object is an underwater craft.

13. The apparatus of claim 10, wherein said wing is attached to the top of said vehicle in a substantially horizontal position.

14. The apparatus of claim 10, wherein a pair of said wings are attached to each side of said vehicle in a substantially vertical position.

* * * * *